United States Patent [19]

Magee

[11] Patent Number: 4,763,049
[45] Date of Patent: Aug. 9, 1988

[54] BRUSHLESS DRIVE SYSTEM

[76] Inventor: Harold H. Magee, 485 Chinquapin Trail, Christiansburg, Va. 24073

[21] Appl. No.: 58,916

[22] Filed: Jun. 5, 1987

Related U.S. Application Data

[63] Continuation-in-part of Ser. No. 839,960, Mar. 17, 1986, abandoned.

[51] Int. Cl.$^4$ .............................................. H02K 29/08
[52] U.S. Cl. ................................................ 318/254
[58] Field of Search ................. 318/138, 254, 345 C, 318/345 D, 345 G, 345 H, 439

[56] References Cited

U.S. PATENT DOCUMENTS 3,529,220  9/1970  Kobayashi et al. ............. 318/254 X
3,559,014  1/1971  Rakes ............................. 318/254 X
3,946,292  3/1976  Tanikoshi ..................... 318/254 A X Primary Examiner—Bentsu Ro
Attorney, Agent, or Firm—Morgan & Finnegan

[57] ABSTRACT

The present invention relates to a brushless drive system for brushless D.C. Motors which can be employed with known servo amplifiers and PWM amplifiers, and systems and includes a switch array for controlling the directional rotation of a brushless D.C. Motor where the switch array has at least one pair of bi-directional switches. The brushless drive system further includes a sensing apparatus for sensing the rotor position of a brushless DC motor, a selecting apparatus for selectively activating at least one pair of bi-directional switches of the switch array in response to a signal received from the sensing apparatus, and a power source connected to each pair of bi-directional switches of the switch array, the power supply being adapted to reverse voltage polarity to the selectively actuated pair or pairs of bi-directional switches of the switch array thus reversing the directional rotation of the brushless D.C. motor.

6 Claims, 3 Drawing Sheets

BRUSHLESS DRIVE SYSTEM

This is a continuation-in-part application of U.S. patent application Ser. No. 06/839,960 which was filed on Mar. 17, 1986, now abandoned.

BACKGROUND OF THE INVENTION

This invention relates to a brushless drive system for brushless D.C. Motors. In particular, the invention relates to a brushless drive system having a switch array for driving a brushless D.C. motor where the switch array includes at least one pair of bi-directional switches and the rotational direction of the brushless D.C. motor can be changed by reversing the voltage polarity at the two terminals where the power source is applied to the switch array.

The advantageous attributes of brushless DC motors over conventional brush-type DC motors are well known. Some of them are: (1) longer lifetime and increased reliability due to the lack of brushes, (2) better thermal characteristics since the wound element is stationary and may be easily connected to a heatsink, (3) better motor characteristics in a given package size since the maximum motor current and speed are not limited by brush contact surface, (4) in general, lower rotor inertia for a given output resulting in better servo performance.

However, industry has never vigorously pursued programs to replace brush-type DC motors with brushless DC motors on a one-for-one basis.

Part of the hesitancy in adopting brushless motors unilaterally in place of brush-type motors has been due to: (1) the existence of operational systems that already incorporate brush-type motors (historical inertia), (2) a lack of understanding of the application of brushless motors to the user's advantage, and (3) the requirement of larger and more complicated electronic controls for brushless DC motors. This invention addresses (1) and (3) in that it presents the user with a device containing simple drive electronics that may be interfaced with the user's present servo amplifier and system.

The invention is based upon the present availability of power MOSFET semiconductors in wide voltage and current ranges. The MOSFET configuration used is known; documentation exists that refers to the configuration as "switch" and "high-current analog switch". See, for instance, the Siliconix Mospower Design Catalog, January 1983, pp. 6-43 to 6-5 and the Silconix Mospower Applications book, 1984, Chapter 6.13.9. MOSFET's have also been applied in the conventional "6-switch" configuration in the industry. However, none of the previous references refer to using this particular MOSFET configuration with brushless DC motors.

SUMMARY OF THE INVENTION

Hence, with the foregoing in mind, it is a primary object of the present invention to provide an improved apparatus for driving brushless D.C. motors which avoids the aforementioned drawbacks and limitations of the prior art proposals.

Another and more specific object of the present invention aims at providing a new and improved brushless drive system for brushless D.C. motors where the rotational direction of a brushless D.C. motors can be changed by reversing the voltage polarity to a switch array.

It is a further aspect of the present invention to provide a new and improved brushless D.C. motor drive system having a switch array for driving a brushless D.C. motor which includes at least one pair of bi-directional switches.

Yet a further object of the invention aims at providing a MOSFET switch configuration in a brushless drive system for driving a brushless D.C. motor.

In order to implement these and other objects of the invention, which will become more readily apparent as the description proceeds, the present invention comprises a switch array for a brushless D.C. motor including at least one pair of bi-directional switches, the rotational direction of the D.C. motor can be changed by reversing the voltage polarity of the two terminals where the power source is applied to the switch array.

BRIEF DESCRIPTION OF THE DRAWINGS

For a fuller understanding of the nature and the objects of the invention, reference should be had to the following detailed description, taken in connection with the accompanying drawings, in which.

DESCRIPTION OF THE PREFERRED EMBODIMENTS

Figure 1A:
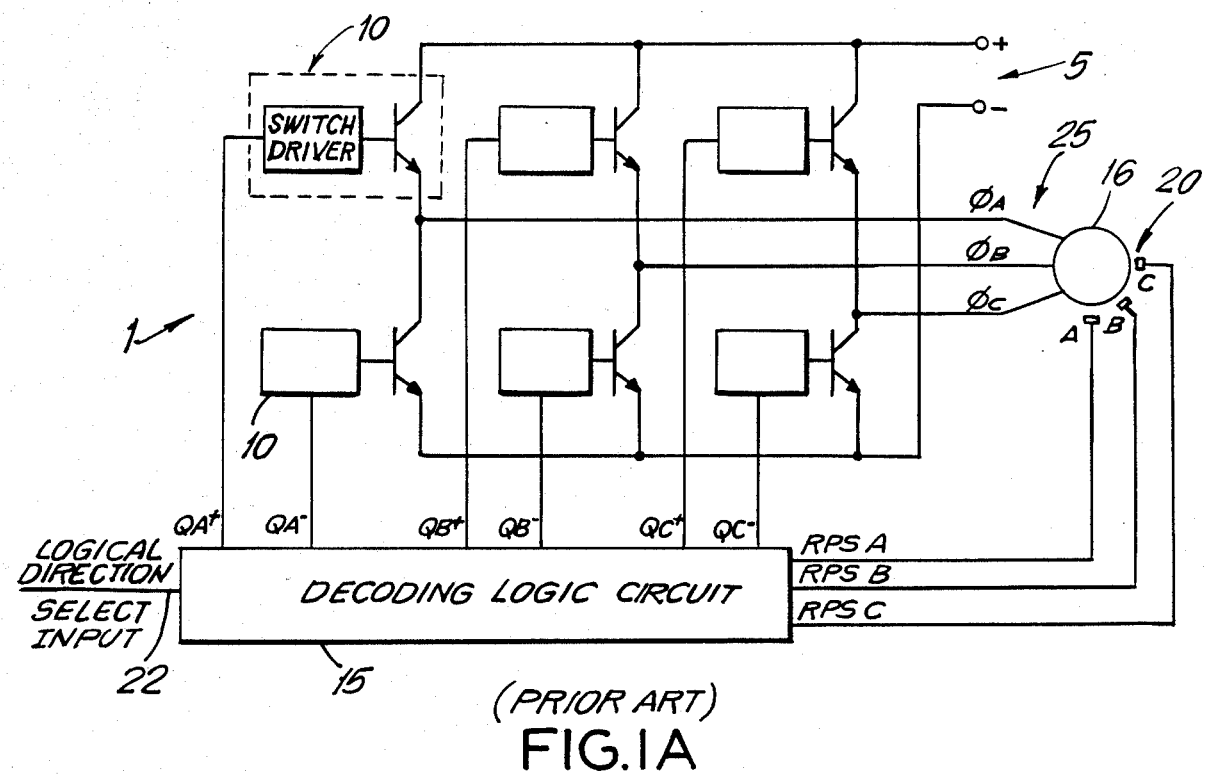
FIG. 1A is a schematic diagram of a conventional commutation drive system using a unidirectional array voltage of the type known in the prior art.
Figure 1B:
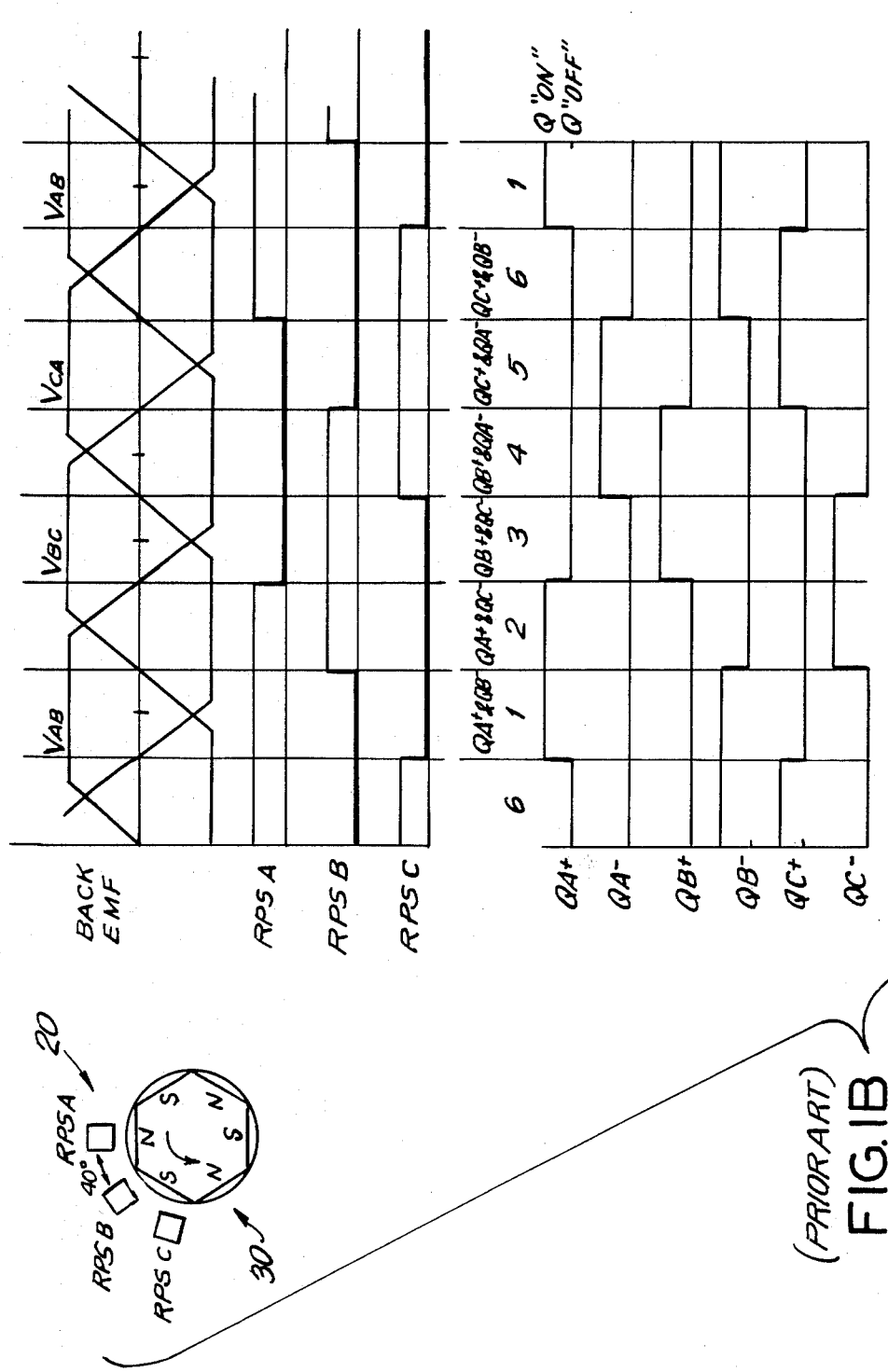
FIG. 1B shows the rotor position sensor commutation for the drive system of FIG. 1A and the associated graphical values.

Referring now to the drawings, and in particular to FIGS. 1A and 1B, a schematic diagram of a conventional commutation system is shown, of the type known in the industry. The type of transistor, the details of the switch driver, the method of implementing the "Decoding Logic", and the number and spacing of the "Rotor Position Sensors" are all dependent upon the application and the particular manufacturer's whim or preference. This approach, regardless of implementation, relies upon the application of a unipolar power supply voltage, array voltage 5, to the power transistor switches 10. The direction of rotation of the motor 16 depends upon the logical interpretation of the states of the Rotor Position Sensors 20. This logical intepretation also includes the high/low, or on/off state of the Logical Direction Select Input 22. This is illustrated below in Chart A.

Chart A is a logic state chart which illustrates the particular coding of the state of the various transistors in response to the Rotor Position Sensors 20 inputs.

The decoding logic is designed to respond to the states of the Rotor Position Sensors 20 and the Logical Direction Select Input 22 in such a way as to apply, through the transistor switches 10, the unipolar array voltage 5 to the selected terminals of the motor 16 so that phase current flows in the desired direction, thus producing torque that causes the motor 16 to rotate in the desired direction. Assuming the logical states of the Rotor Position Sensors (RPS), RPSA, RPSB, and RPSC are "high", "low", and "low", respectively, and that the "Logical Direction Select Input" is "CW" (clockwise) then, according to Chart A, the transistor array has QA+ and QB− transistors "on", current will flow into the motor phase A and out of the motor phase B terminal. This will produce torque in a given direction. If the state of the "Logical Direction Select Input" is changed to CCW (counter clockwise), without modifying the RPS states, then, according to Chart A the transistor array has QA− and QB+ transistors "on", current flows in the opposite direction and produces a correspondingly opposite torque.

tion Sensor information. It is understood that the invention is not limited to a particular type of decoding circuit.

Figure 3:
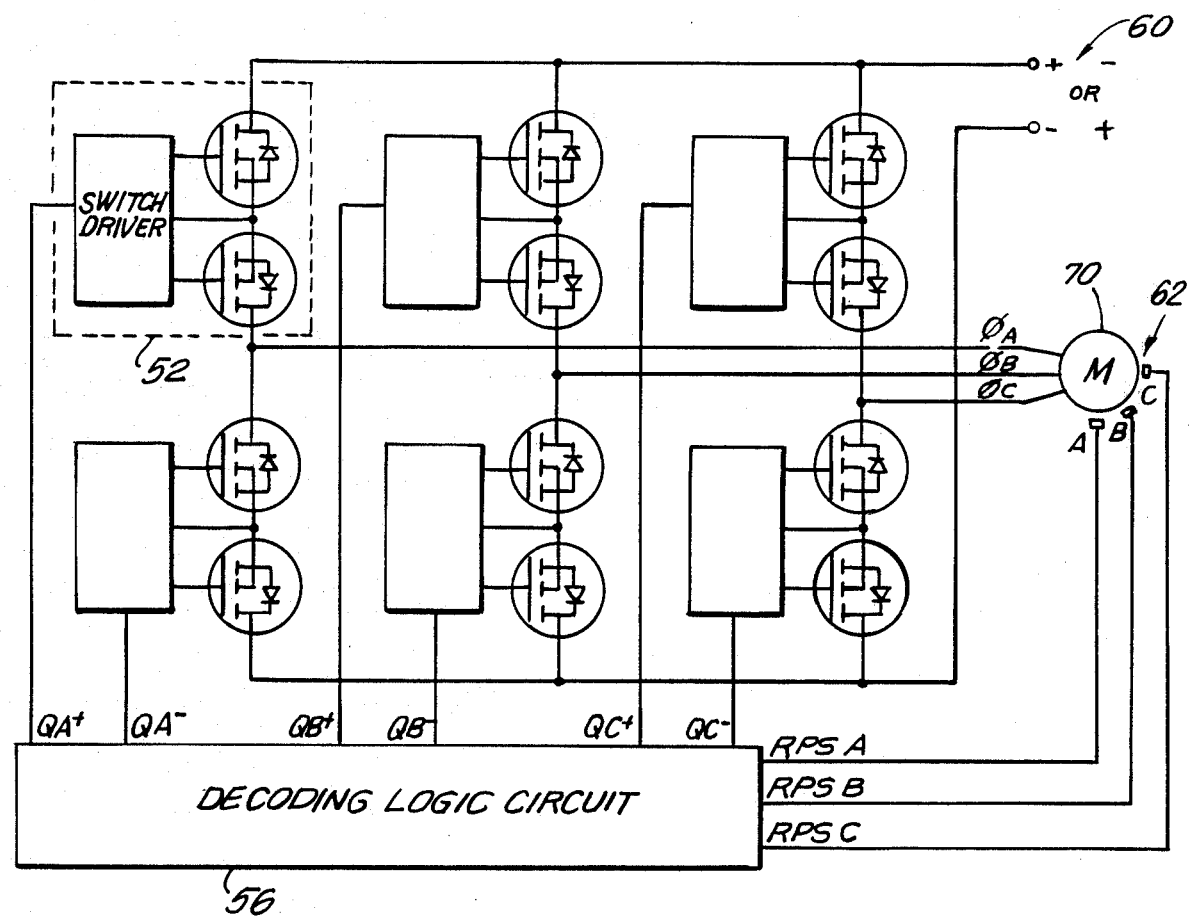
FIG. 3 is a schematic diagram illustrating the embodiment of the present invention.

The Rotor Position Sensors 62 of FIG. 3 can be Hall Effect devices such as UGN 3075 manufactured by SPRAGUE Electric Co. in Concord, N.H. It is understood that the invention is not limited to Hall Effect devices. For example, it is possible to use optical devices for the Rotor Position Sensors 62. However, Hall Effect device are preferred as they immediately provide electrical isolation for each of the switches. The disad-

CHART A

| "Step" | Direction Select | VAB | VBC | VCA | RPSA | RPSB | RPSC | OA+ | OA− | OB+ | OB− | OC+ | OC− |
|---|---|---|---|---|---|---|---|---|---|---|---|---|---|
| 1 | "CW" | P | N | N | H | L | L | ON | OFF | OFF | ON | OFF | OFF |
| 2 | "CW" | P | P | N | H | H | L | ON | OFF | OFF | OFF | OFF | ON |
| 3 | "CW" | N | P | N | L | H | L | OFF | OFF | ON | OFF | OFF | ON |
| 4 | "CW" | N | P | P | L | H | H | OFF | ON | ON | OFF | OFF | OFF |
| 5 | "CW" | N | N | P | L | L | H | OFF | ON | OFF | OFF | ON | OFF |
| 6 | "CW" | P | N | P | H | L | H | OFF | OFF | OFF | ON | ON | OFF |
| 1 | "CCW" | IDENTICAL TO ABOVE | | | | | | OFF | ON | ON | OFF | OFF | OFF |
| 2 | "CCW" | | | | | | | OFF | ON | OFF | OFF | ON | OFF |
| 3 | "CCW" | | | | | | | OFF | OFF | OFF | ON | ON | OFF |
| 4 | "CCW" | | | | | | | ON | OFF | OFF | ON | OFF | OFF |
| 5 | "CCW" | | | | | | | ON | OFF | OFF | OFF | OFF | ON |
| 6 | "CCW" | | | | | | | OFF | OFF | ON | OFF | OFF | ON |

P = Positive
N = Negative
H = High or On
L = Low or Off

Figure 2:
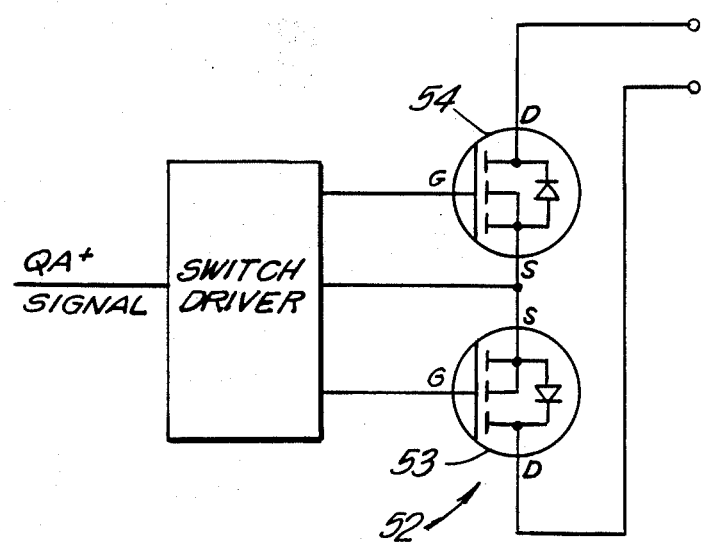
FIG. 2 is a schematic diagram of a Mosfet bi-directional switch of the type employed in the present invention.

FIG. 2 shows a bi-directional switch array used in the invention. The bi-directional switch 52 has two back-to-back power MOSFET transistors 53, 54. This particular back-to-back configuration is useful at low power level for controlling AC signals, especially in communication applications. However there are no known applications for this bi-directional switch 52 for brushless DC motor (or for even AC motor) commutation.

An essential characteristic of power MOSFETs which make them particularly desirable in the invention is that they are resistive elements when switched to the "on" state and exhibit none of the forward conduction offset voltage characteristics of other semiconductor switches. Further, when "off", the MOSFETs, when configured as bi-directional switches, block voltage of either polarity applied to the switch. Therefore, the MOSFET circuit shown in FIG. 2 can conduct or block current in either direction upon command.

FIG. 3 illustrates an embodiment of the invention. As can be seen the circuit of FIG. 3 differs from that of FIG. 1A in that the decoding logic circuit 56 has no direction input and the transistors such as QA+ and QB− have been replaced with bi-directional switches.

Referring to Chart A, and the previously described example where the Rotor Position Sensors RPSA, RPSB and RPSC are "high" "low" and "low", respectively, and the logic direction input was "CW", the need for a logical direction select input is eliminated in the circuit of FIG. 3 by reversing the polarity of the applied array voltage which causes the direction of current in phases A and B to reverse. Thus, the motor 70 will rotate in a direction dependent upon the polarity of applicable transistor array voltage 60.

The decoding logic circuit 56 of FIG. 3 can be implemented as either logic gates, or as a PROM chip such as the 82S235, 32×8 Prom chip manufactured by Signetics or by a variety of other technologies including CMOS and TTL circuitry. U.S. Pat. No. 4,479,078 assigned to Kollmorgen Corporation, the assignee of the present application, discloses a device for decoding Rotor Posivantage of any optical device is that their lens systems may become contaminated over time because of contaminants in the air.

Figure 4:
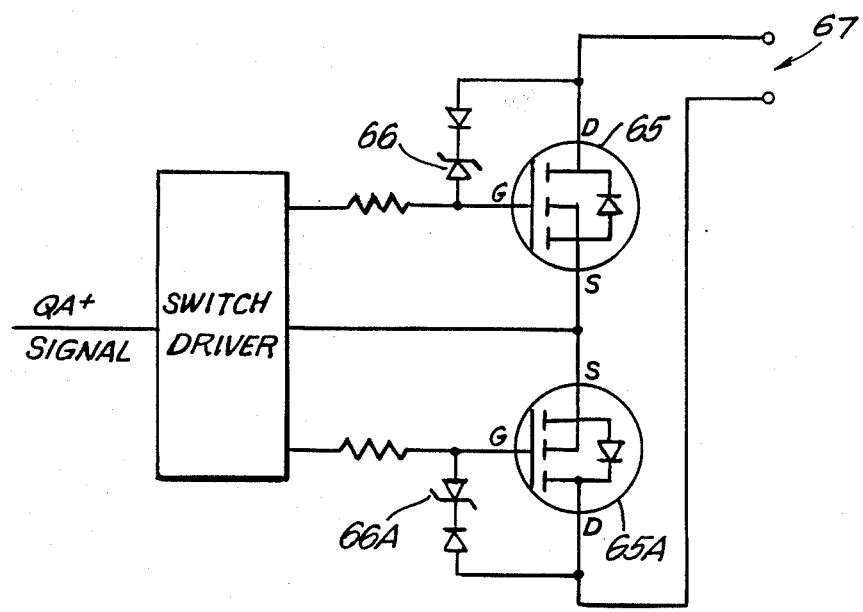
FIG. 4 is a further embodiment of the switch drive system of FIG. 3.

FIG. 4 illustrates a more general approach for protecting against voltage spikes. When the voltage across the drain and the source of either MOSFET 65, 65A rises above the threshold voltage of the Zener diode 66, 66A, respectively, the MOSFET 65, 65A will begin conducting thereby clamping voltage rise to a safe level. The Zener voltage is chosen as a function of the ratings of the MOSFETs and the array operating voltage 67.

The invention requires an auxiliary power source of 12–15 VDC to power a small, low-power switch power supply which in turn provides power to each of the 6 switch drivers and the decoding logic as seen in FIG. 3.

The availability of power MOSFETs limits the range of voltages and currents that can be provided to the motor. In most cases, due to the nature of the semiconductors themselves, higher currents require lower voltages; higher voltages require lower currents, i.e., the devices are power limited. It is possible, in the inventive system, to parallel individual MOSFET devices to improve current capability for a given bus voltage. Most brush-type motor applications tend to be low voltage (under 100 VDC) and the voltage requirements for those systems may fit well with available semiconductors. To take best advantage of the characteristics of brushless DC motors, however, higher voltages may be required; this is dependent upon the particular application.

Although the above description particularly deals with a system for three-phase brushless motors, the concept of that system can be utilized with and applied to multi-phase motors. In fact, it is possible to take a brush-type motor and replace the pairs of communication bars with pairs of switches and increase the number of Hall-Effect Sensors until the brush-type commutation is duplicated exactly using electronics. This switching concept may also be applied to linear D.C. brushless motors as well.

I do not limit myself to any particular details of construction set forth in this specification and illustrated in the accompanying drawings, as the same refers to and sets forth only certain embodiments of the invention, and it is observed that the same may be modified without departing from the spirit and scope of the invention.

Having thus described the invention, what I claim as new and desire to be secured by Letters Patent is as follows:

1. A brushless drive system for brushless D.C. motors which can be employed with known servo amplifiers and PWM amplifiers and systems, comprising in combination:
    a MOSFET switch array for controlling directional rotation of a brushless D.C. motor, said MOSFET switch array including at least one pair of bi-directional MOSFET switches;
    sensing means for sensing the rotor position of the brushless D.C. motor;
    selecting means for selectively activating at least one pair of bi-directional MOSFET switches of said MOSFET switch array in response to signals received from said sensing means; and
    a power source connected to each pair of bi-directional MOSFET switches of said MOSFET switch array, said power source being adapted to reverse voltage polarity to said at least one selectively activated pair of bi-directional MOSFET switches of said MOSFET switch array thereby reversing the directional rotation of said brushless D.C. motor.

2. A brushless drive system according to claim 1 wherein said brushless D.C. motor is a three-phase brushless D.C. motor having windings and said MOSFET switch array includes six pairs of MOSFET switches, and each phase of said brushless D.C. motor is connected to two pairs of MOSFET switches.

3. A brushless drive system according to claim 1 wherein said sensing means are rotor position sensors.

4. A brushless drive system according to claim 3 wherein said rotor position sensors are Hall Effect devices.

5. A brushless drive system according to claim 1 wherein said selecting means is a decoding logic circuit.

6. A brushless drive system according to claim 5 wherein said decoding logic circuit is a PROM.

* * * * *